United States Patent
Goel et al.

(10) Patent No.: US 12,058,241 B2
(45) Date of Patent: Aug. 6, 2024

(54) SECURELY AND RELIABLY TRANSMITTING MESSAGES BETWEEN NETWORK DEVICES

(71) Applicant: Microsoft Technology Licensing, LLC, Redmond, WA (US)

(72) Inventors: Deepak Goel, San Jose, CA (US); Kambiz Rahimi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 17/341,122

(22) Filed: Jun. 7, 2021

(65) Prior Publication Data
US 2022/0393856 A1    Dec. 8, 2022

(51) Int. Cl.
*H04L 9/08* (2006.01)
*H04L 9/40* (2022.01)

(52) U.S. Cl.
CPC .............. *H04L 9/08* (2013.01); *H04L 63/08* (2013.01)

(58) Field of Classification Search
CPC . H04L 9/08; H04L 63/08; H04L 63/12; H04L 63/061; H04L 63/0876; H04L 63/123; H04L 63/062; H04L 63/0435
See application file for complete search history.

(56) References Cited

U.S. PATENT DOCUMENTS

| | | | | |
|---|---|---|---|---|
| 4,924,513 | A * | 5/1990 | Herbison | H04L 9/083 380/43 |
| 5,081,678 | A * | 1/1992 | Kaufman | H04L 9/0822 713/160 |
| 6,744,765 | B1 | 6/2004 | Dearth et al. | |
| 8,370,920 | B2 | 2/2013 | Garrard et al. | |
| 9,137,139 | B2 | 9/2015 | Roosta et al. | |
| 9,304,964 | B2 | 4/2016 | Schoinas et al. | |
| 10,581,874 | B1 * | 3/2020 | Khalid | H04L 63/1425 |
| 2002/0035681 | A1 | 3/2002 | Maturana et al. | |
| 2003/0061480 | A1 * | 3/2003 | Le | H04L 63/061 713/153 |
| 2003/0191946 | A1 * | 10/2003 | Auer | H04L 63/08 713/182 |
| 2007/0033391 | A1 * | 2/2007 | Hiramatsu | H04L 9/0838 713/153 |

(Continued)

OTHER PUBLICATIONS

"RFC 4303—IP Encapsulating Security Payload (ESP)", Retrieved From: https://datatracker.ietf.org/doc/html/rfc4303, Dec. 31, 2005, pp. 1-44.

(Continued)

*Primary Examiner* — Abu S Sholeman
(74) *Attorney, Agent, or Firm* — Ray, Quinney & Nebeker; James S. Bullough

(57) ABSTRACT

The present disclosure relates to systems for generating network packets that facilitate reliable and secure transmission of data between computing devices. For example, systems described herein involve generating a network packet in which a transport layer and security layer are implemented within an authentication header of the network packet. Information from the authentication header may be evaluated by a receiving device using a security key to compute an integrity check vector and an initialization vector to determine that a network packet has been provided in a correct order as well as check against a variety of security threats.

20 Claims, 6 Drawing Sheets

(56) References Cited

U.S. PATENT DOCUMENTS

| | | | |
|---|---|---|---|
| 2014/0195810 A1* | 7/2014 | Metivier | H04L 9/14 |
| | | | 713/172 |
| 2014/0281530 A1 | 9/2014 | Song et al. | |
| 2015/0372808 A1* | 12/2015 | Bilogrevic | G06N 7/01 |
| | | | 380/279 |
| 2016/0057118 A1* | 2/2016 | Lee | H04L 9/0861 |
| | | | 713/171 |
| 2020/0099671 A1 | 3/2020 | Shaw et al. | |

OTHER PUBLICATIONS

"International Search Report and Written Opinion Issued in PCT Application No. PCT/US22/028417", Mailed Date: Aug. 23, 2022, 12 Pages.

"Non Provisional Application Filed in U.S. Appl. No. 17/199,209", filed Date: Mar. 11, 2021, Oct. 25, 2020, 42 Pages.

Fischlin, et al., "Robust Channels", Retrieved from: https://web.archive.org/web/20200928061423/https:/eprint.iacr.org/2020/718.pdf, Jun. 15, 2020, pp. 1-39.

Mukherjee, et al., "End-to-End IoT Security Middleware for Cloud-Fog Communication", In Proceedings of IEEE 4th International Conference on Cyber Security and Cloud Computing, Jun. 26, 2017, pp. 151-156.

* cited by examiner

SECURELY AND RELIABLY TRANSMITTING MESSAGES BETWEEN NETWORK DEVICES

BACKGROUND

Recent years have seen a rise in the use of computing devices (e.g., mobile devices, personal computers, server devices, cloud computing systems) to receive, store, edit, transmit, or otherwise utilize digital data. Indeed, it is now common for computing devices to communicate digital content over wired and wireless communication networks at high speeds for a variety of applications. For example, high speed computing applications may cooperatively utilize chips across multiple devices increasing a need for high bandwidth communications between the devices. Facilitating high speed communication between devices, however, poses a number of problems and challenges.

For example, security of data is often a concern when communicating data via communication channels. To address this, encryption and decryption keys are often distributed between pairs of computing devices. While these encryption and decryption key(s) provide an important measure against many malicious actors in infiltrating data, there are still a number of ways in which data can be compromised. For example, replay attacks can occur in which a packet is provided multiple times. Other attacks may involve modifying various fields or attempting to modify or replace the packet with another packet.

These and other challenges exist in connection with transmitting data between devices and other electrical hardware.

DETAILED DESCRIPTION

Figure 1:
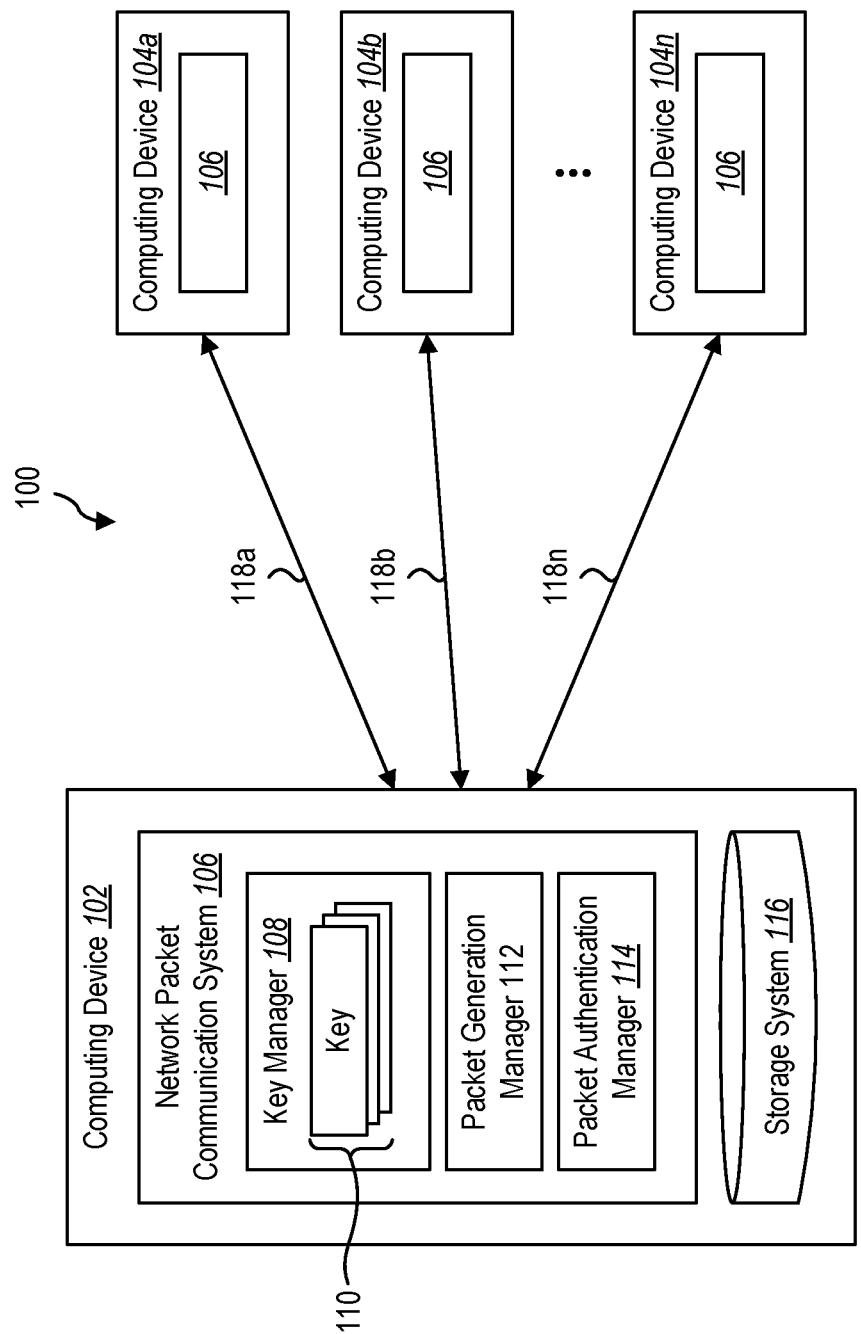
FIG. 1 illustrates an example environment of a first computing device in communication with one or more additional computing devices in accordance with one or more embodiments.

The present disclosure is generally related to high speed transmission of data between devices that are connected via one or more communication channels. In particular, this disclosure describes features and functionality related to generating and transmitting a network packet having a number of fields and stacks that enable devices to communicate secured data (e.g., encrypted payload data) while also enabling a device that receives the data to quickly and efficiently authenticate the data included therein. As will be discussed in further detail below, this involves combining both transport layer and security layer fields within a single header of a network packet such that a network packet includes fewer header bits while still allowing the respective device(s) to ensure proper security and transport of an encrypted payload.

As an illustrative example, this disclosure describes a network packet communication system on a computing device (e.g., a sender device) that receives a first security key for encrypting and/or decrypting data to be communicated between the computing device and one or more additional computing devices (also having the security key thereon). The network packet communication system may generate a unique network packet including a variety of fields within respective stacks or headers of the network packet. For example, in one or more embodiments described herein, a network packet includes an authentication header, encrypted content (e.g., a packet payload), and a security tag (e.g., an integrity check vector (ICV)) appended or otherwise added to the network packet. A receiver device, upon receiving the network packet, can calculate an initialization vector and an ICV to authenticate the network packet, which may involve determining whether the network packet was transported correctly (e.g., in order relative to other network packets) as well as verifying that the network packet was communicated securely over a communication channel.

The present disclosure includes a number of practical applications that provide benefits and/or solve problems associated with transmitting data both correctly and securely between two or more computing devices while also integrating the security and transport layers within a single header. The present disclosure further includes features and functionality related to increasing an efficiency with which the data is communicated between respective devices. Examples of some of these applications and benefits are discussed in further detail below.

For example, one or more embodiments described herein involve including data fields that are instrumental to both transportation and security within a single header of a network packet. In particular, by combining security and transport layers within a single header, implementations of network packets described herein can facilitate transmission of digital data using fewer bytes than conventional network packets in which transportation layers and security layers are included within separate headers and separate stacks. This allows for more efficient transmission of data than conventional network packet communication systems.

In addition to improving efficiency of data transmission, one or more embodiments described herein facilitate communication of unique network packets without decreasing reliability with which the data is transported. Features and functionalities of the network packets described herein further facilitate communication without jeopardizing security of the payload content. For example, as will be discussed in further detail herein, the sender and receiver devices may utilize security keys to compute or otherwise generate ICVs and initialization vectors based on values within the authentication header to verify that data has been transported correctly and securely over a communication channel between the respective devices. In many cases, this applies to communications made over secure or non-secure communication channels.

In addition to increasing security and reliability of data transmission, one or more embodiments further include identifying security groups within which any device of the identified security group can communicate to any other device of the security group in a similar manner and without jeopardizing security of the data. Further, as will be discussed in connection with various examples below, systems described herein may distribute a set of keys such that any device within the security group is able to receive and decrypt data that is encrypted by any of the other devices using a corresponding key(s). This provides a scalable distribution of keys that facilitates secure and reliable communication between devices of the security group rather than requiring that every possible pair of devices within the security group have a unique key pair.

One or more embodiments described herein further include features related to exchanging or renewing the keys without interrupting transmission of data. For example, in one or more embodiments, the systems described herein involve providing a set of keys in which one key is active and one or more additional keys are indicated as inactive. In this way, when a period of time has passed that triggers renewing security credentials, one of the inactive key(s) may be designated as active while the previously active key is exchanged with a new key or phased out of use. As will be discussed below, this may be done without interrupting transmission of data between devices that may be caused by exchanging an active key with another new active key.

As illustrated in the foregoing discussion, the present disclosure utilizes a variety of terms to describe features and advantages of the systems herein. Additional detail is now provided regarding the meaning of some example terms.

As used herein, a "network packet" may refer to a unit of data carried from a first device (e.g., a computing device, a chip) to a second device via a communication channel. In one or more embodiments, a network packet includes control information and a payload. The payload may refer to content of a memory block or portion of a memory block being transmitted between a sender device and a receiver device (or between chips on the same or different devices). The control information may include any additional information that enables a network controller and/or processor on an associated device to authenticate or otherwise verify that the network packet has been transmitted correctly and securely between the respective devices. As will be discussed in further detail below, the control information may include one or more fields including a transportation layer and a security layer within a single header (e.g., an authentication header) or stack (as opposed to separate stacks as is the case in conventional network packets).

As used herein a "key" or "security key" may refer interchangeably to an encryption and/or decryption key or token that is distributed to multiple devices for use in encrypting and/or decrypting data communicated between the devices. For example, in one or more embodiments, a first device may use a key to encrypt a payload and one or more portions of the control information. A second device may also receive a key (e.g., a copy of the key provided to the first device) that enables the second device to decrypt the payload as well as verify values of one or more fields included within the control information of the network packet. In one or more embodiments, the keys refer to symmetric key cryptographic block ciphers having sixteen bytes (128 bits) that utilize Galois/Counter Mode (GCM) mode of operation. In one or more embodiments, a key refers to a copy of a key provided by a key issuing authority and may be distributed using a variety of exchange mechanisms or other known key distribution techniques.

As used herein, a "security group" may refer to a group of devices or network controllers that utilize a set of keys (e.g., a set of key copies). For example, in one or more embodiments, a security group refers to a first device and a second device having a pair of security keys that enable the respective devices to encrypt data, transmit data, and decrypt the received encrypted data. As will be discussed in further detail below, a security group may include any number of devices having access to a set of keys that enables the devices to communicate with one another via one or more communication channels.

Additional detail will now be provided regarding examples of systems and devices in relation to illustrative figures portraying example implementations. For example, FIG. 1 illustrates an example environment 100 including a first computing device 102 and one or more additional computing devices 104a-n. Each of the devices 102, 104a-n may be configured to communicate data to each other in accordance with one or more embodiments described herein. As shown in FIG. 1, each of the computing devices 102, 104a-n may include a network packet communication system 106 implemented thereon providing features and functionality described herein in connection with securely and reliably transmitting network packets between devices of the computing environment 100.

The computing devices 102, 104a-n may refer to a variety of computing devices in a variety of computing environments. For example, in one or more embodiments, one or more devices may refer to client devices, such as mobile devices (e.g., mobile telephone, smart phone, tablet, laptop) or non-mobile devices (e.g., desktop computer, server device) that are connected via wired or wireless communication networks. In one or more embodiments, the computing devices 102, 104a-n refer to network devices of a cloud computing system. As will be discussed in connection with one or more implementations herein, in one or more embodiments, the environment 100 includes interconnected devices having chips and other hardware that are connected (e.g., via a backend network) to provide fast and efficient chip to chip communications between the respective devices.

Additional detail will now be discussed in connection with a first computing device 102 having a network packet communication system 106 implemented thereon. It will be appreciated that each of the additional computing devices 104a-n may have similar features and functionality as the first computing device 102 and may have a corresponding network packet communication system 106 implemented thereon. Thus, it will be understood that any features and functionality described in connection with the computing device 102 and/or the network packet communication system 106 may similarly apply to any other computing device having the network packet communication system 106. Moreover, while one or more embodiments described herein refer specifically to various components and features of the network packet communication system 106 implemented on a corresponding computing device, it will be appreciated that one or more of the individual components and/or individual features described in connection with systems described herein may be implemented in whole or in part across different devices.

As shown in FIG. 1, the network packet communication system 106 may include a key manager 108. The key manager 108 may have one or more keys 110 maintained thereon. The key manager 108 may manage collection and/or distribution of keys 110 between the first computing device 102 and one or more of the additional computing devices 104a-n. For example, in one or more embodiments, the key manager 108 maintains a key for each of multiple communication channels 118a-n connecting the first computing device 102 and each of the additional computing devices 104a-n.

The network packet communication system 106 may utilize the keys 110 in a variety of ways in the process of sending and receiving network packets described herein. For example, in one or more embodiments, the network packet communication system 106 may utilize a key to encrypt one or more portions of a network packet. Alternatively, the network packet communication system 106 may utilize the key to decrypt encrypted data from a network packet. In addition, and as will be discussed in further detail below, the network packet communication system 106 may utilize the key to generate or otherwise calculate an initialization vector for use in facilitating authentication of the network packet on a receiver device. Additional information in connection with generating, maintaining, and utilizing one or more keys will be discussed in further detail below.

As shown in FIG. 1, the network packet communication system 106 may additionally include a packet generation manager 112. In one or more embodiments, the packet generation manager 112 can identify data to be transmitted to a receiver device and generate one or more network packets that include the identified data. More specifically, and as will be discussed in further detail below, the packet generation manager 112 may generate a network packet including control information and an encrypted payload and transmit the network packet to one or more of the additional computing devices 104a-n via a corresponding communication channel 118a-n.

As noted above, a network packet may include control data and an encrypted payload. As will be discussed in further detail below, the packet generation manager 112 can encrypt an identified block of data from a storage system 116 of the computing device 102 and encrypt the data using one or more of the keys 110. The encrypted block of data may be included within a payload of the network packet. In one or more embodiments, the identified data may be spread across multiple network packets, such as where the payload for each network packet has a maximum predetermined size (e.g., 2 kilobytes (KB), 4 KB, 8 KB, 16 KB, 32 KB).

As mentioned above, in addition to the encrypted payload, the network packets may include control data. By way of example and not limitation, each network packet may include a number of headers including various instructions associated with sending and/or receiving the network packet. For instance, in one or more embodiments, the network packet(s) include an Ethernet header and an IPv4 header that is neither authenticated nor encrypted. In addition, the network packets may have an authentication header, which may include source and destination addresses, a user datagram protocol (UDP) portion, and additional authentication information (e.g., an ATL portion). In one or more embodiments, the network packets may further include an integrity check vector (ICV) tag appended to the payload. One or more of these headers, tags, and other elements of the payload and/or control data will be discussed in further detail below.

As further shown in FIG. 1, the network packet communication system 106 may include a packet authentication manager 114. The packet authentication manager 114 may be used upon receiving a network packet to authenticate content of the network packet. In particular, the packet authentication manager 114 may read information from an authentication header to determine whether the network packet was transported correctly and verify the information included within the network packet has remained secure and unaltered. As mentioned above, in one or more embodiments, the transport layer and the security layer of the network packet are integrated within a single authentication header. Accordingly, in one or more embodiments, the packet authentication manager 114 may both determine that the network packet has been delivered correctly (e.g., in a correct order relative to other network packets) as well as verify that data within the payload has not been compromised in one of a variety of ways.

As will be discussed in further detail below, the packet authentication manager 114 may authenticate the network packet by applying a key to one or more fields of the authentication header to generate or otherwise calculate an initialization vector and/or ICV for the received network packet. For example, in one or more embodiments, the ICV may be computed over an authentication header and the payload. Computing the ICV over the authentication header and the payload may include applying the security key to the authentication header and the payload to compute a value that may be used to verify that the payload has not been modified in any way between generating and transmitting a network packet. In one or more embodiments, the sender device computes the ICV when generating the network packet. In addition, a receiver device may calculate the ICV over the header(s) and payload upon receiving the network packet. Computing the ICV over the header(s) and payload may include applying the key over the authentication header and the payload upon receiving the network packet and verifying that the computed ICV matches the ICV generated by the sending device and included within the network packet.

The packet authentication manager 114 may evaluate one or more fields from the generated initialization vector and compare the respective fields to corresponding fields from the ICV and authentication header to authenticate the network packet. Additional information in connection with generating the initialization vector, determining correct transportation, and verifying security of the data will be discussed in further detail below.

As further shown in FIG. 1, the network packet communication system 106 may include a storage system 116. The storage system 116 may refer to a memory and/or storage hardware on which any data is accessible to the network packet communication system 106 in generating network packets and communicating data between devices of the computing environment 100. For example, the storage system 116 may include blocks of data to be communicated from a chip on the computing device 102 to one or more chips on other computing devices 104a-n that may be used in a variety of applications.

As shown in FIG. 1, the computing environment 100 may include a number of communication channels 118a-n connecting the first computing device 102 with additional computing devices 104a-n. In one or more embodiments, the communication channels 118a-n refer to wired connections between respective devices. The communication channels may be secure or unsecure communication channels with varying levels of security. In one or more embodiments, the communication channels 118a-n refer to Ethernet wires that connect the respective devices. Indeed, the communication channels 118a-n may refer to any backend interface that enables communication of data between the first computing device 102 and any of the additional computing devices 104a-n.

As noted above, each of the first computing device 102 and additional computing devices 104a-n may have similar features and functionality as one another. In one or more embodiments, the computing device 102 may act as a sender device while the additional computing devices 104a-n may refer to receiver devices. Conversely, the additional computing devices 104*a-n* may refer to sender devices that generate network packets and provide data to the first computing device 102 as a receiver device. Moreover, while not shown in FIG. 1, in one or more embodiments, each of the additional computing devices 104*a-n* may be configured to provide network packets to one another via additional communication channels connecting one or more of the additional computing devices 104*a-n*.

Figure 2:
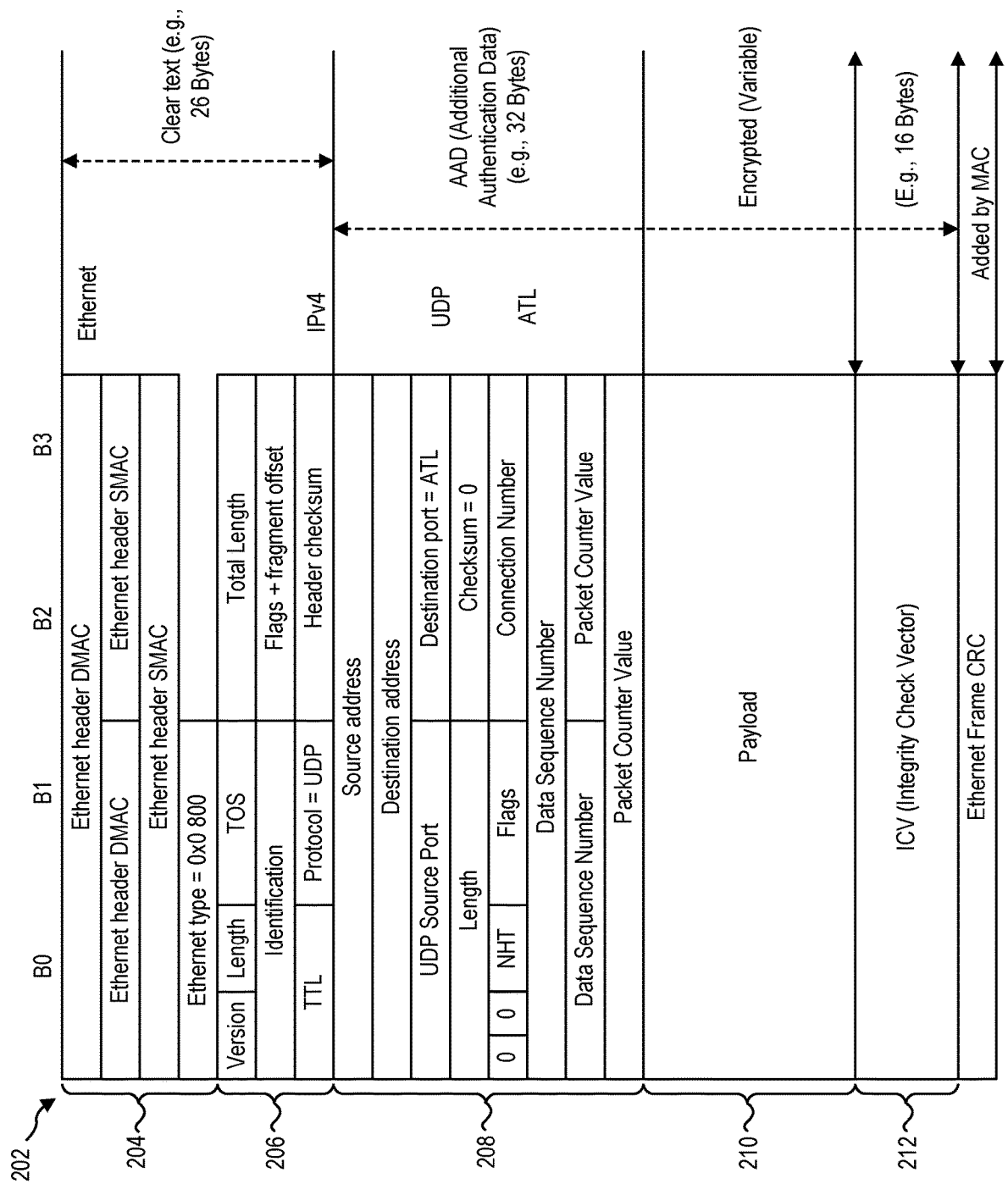
FIG. 2 illustrates an example implementation of a network packet including an authentication header within which a security layer and transport layer of the network packet are implemented.

FIG. 2 illustrates an example implementation of a network packet 202 in accordance with one or more embodiments. In particular, FIG. 2 illustrates a network packet 202 having a payload and control data that enables a sender device (e.g., computing device 102) transmit encrypted data to one or more receiver devices (e.g., additional computing devices 104*a-n*). As shown in FIG. 2, the network packet 202 may include control information within a plurality of headers (e.g., headers 204-208), a payload 210, and an integrity check vector (ICV) tag 212. Additional information in connection with each of these elements of the network packet 202 will be discussed herein.

As just mentioned, the network packet 202 may include an Ethernet header 204 and an IPv4 header 206. As shown in FIG. 2, the Ethernet header 204 and IPv4 header 206 may include twenty-six bytes of text. The text of these headers 204-206 may be clear and accessible to read by a computing device without having access to an encryption/decryption key.

As shown in FIG. 2, the Ethernet header 204 may include a number of fields of various sizes. In one or more embodiments, the Ethernet header 204 has fourteen bytes of non-authenticated and non-encrypted text. As shown in FIG. 2, the Ethernet header 204 may include a destination memory access control (DMAC) header field indicating an address of a destination interface or device. The Ethernet header 204 may also include a source memory access control (SMAC) header field indicating an address for a source interface or device. In one or more embodiments, the Ethernet header is replaced at every packet switch hop.

As shown in FIG. 2, the IPv4 header 206 may also include a number of fields of various sizes. In one or more embodiments, the IPv4 header 206 has twelve bytes of non-authenticated and non-encrypted data. By way of example, and as shown in FIG. 2, the IPv4 header 206 may include bytes of information indicating a version, a length, a type of service (TOS), a total length, an identifier (ID), flags and fragment offsets, a time-to-live (TTL) field, a protocol field, and a header checksum. In one or more embodiments, each router hop may decrement a TTL field before forwarding the network packet 202. Where this field is protected using authentication, switches may update the ICV tag after modification of the TTL field.

As further shown, the network packet 202 may include an authentication header 208 (e.g., additional authentication data (AAD)), which may include a UDP portion and an ATL portion. In one or more embodiments, the authentication header 208 refers to a portion of the network packet 202 including authenticated data that has not been encrypted. In this example, the authentication header 208 may have thirty-two bytes of authenticated data that is not encrypted.

As shown in FIG. 2, the authentication header 208 may include a variety of fields. By way of example, the authentication header 208 may include an IPv4 source address within a first field and an IPv4 destination address within a second field. The authentication header 208 may additionally include a UDP header that carries source port information (e.g., connection information) and destination portion information, which may be used to identify ATL headers). In one or more embodiments, the UDP portion of the authentication header 208 may include a UDP source port, a destination port, a length, and an indicated checksum value.

As further shown, the authentication header 208 may include an ATL portion that carries initialization vector information as well as information about whether a tunnel is secured or not. In one or more embodiments, the ATL portion of the authentication header 208 may include a connection number, a data sequence number, and a packet counter value. The connection number may include an indication of a communication channel between respective devices. The data sequence number may refer to a number of packets communicated between a respective pair of devices. The packet counter value may refer to a number of packets from a specific source device. Accordingly, where a first device transmits twenty packets between multiple devices, the packet counter value may increment by a value of twenty. Alternatively, where only ten of those packets are transmitted to a specific second device, the data sequence number associated with that channel may increment by a value of ten.

As further shown in FIG. 2, the network packet 202 may include a payload 210. The payload may include encrypted data that is only readable by another device having a copy of the security key used to encrypt the data. Further, the payload 210 may have a fixed size based on specifications of a network controller, a processor, or other hardware on the respective devices. For example, in one or more embodiments, the payload may have a fixed size of 2 KB, 4 KB, 8 KB, 16 KB, 32 KB or other fixed or otherwise predetermined size. Upon receiving a network packet 202 and determining that the network packet 202 has been transmitted correctly and securely between devices, a receiving device may apply a key to the encrypted payload to decrypt the data and process the data in a variety of ways.

As further shown, the network packet 202 may include an ICV tag 212. In one or more embodiments, the ICV tag 212 includes information that may be used by the receiver device to check integrity of the network packet 202. In particular, a receiver device use a key to calculate and/or increment values of an initialization vector and determine whether values of the ICV tag 212 and/or values of the authentication header 208 match the calculated initialization vector. If the values match, a network packet communication system 106 on the receiver device may determine that the network packet 202 has not been modified and that the network packet 202 has been transported correctly.

As further shown in FIG. 2, the network packet may include an Ethernet frame cyclic redundancy check (CRC). The Ethernet frame CRC may include four bytes, which may be generated over device addresses and other fields of the network packet 202. In one or more embodiments, each hop of the network packet 202 generates a new CRC based on the Ethernet frame. This field can catch bit-flips due to errors on the wire and may conform with the Ethernet standard.

As noted above, one or more computing devices may receive a variety of security keys for encrypting and/or decrypting data passed between respective computing devices. As further mentioned above, while one or more embodiments described herein relate specifically to a first device communicating a network packet to a second device having a matching key to a key held by the sender device, one or more embodiments may further involve security groups.

Figure 3:
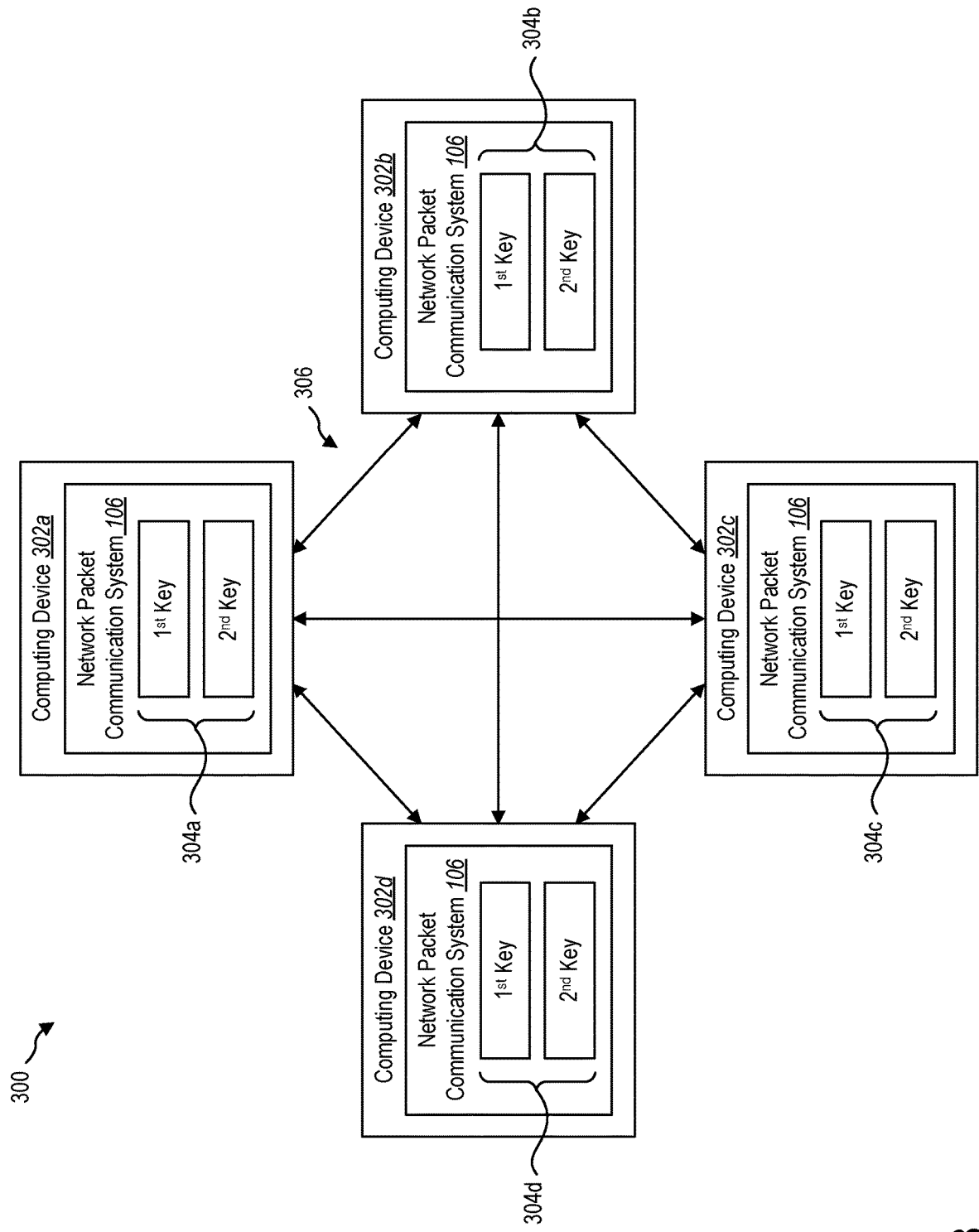
FIG. 3 illustrates an example security group having shared security key(s) implemented thereon in accordance with one or more embodiments.

For example, FIG. 3 illustrates an example security group 300 including a plurality of computing devices 302*a-d* that have been assigned to the security group 300. Each of the computing devices 302a-n may have an instance of the network packet communication system 106 implemented thereon having features and functionalities as similar components described herein.

In addition, each of the computing devices 302a-d may include a corresponding set of keys 304a-d thereon. For example, a first computing device 302a may have a first set of keys 304a, a second computing device 302b may have a second set of keys 304b, a third computing device 302c may have a third set of keys 304c, and a fourth computing device 302d may have a fourth set of keys 304d. Each of the respective set of keys 304a-d may be copies of one another and capable of decrypting data that has been encrypted by a corresponding key. Each of the computing devices 302a-d may communicate over a set of communication channels 306 connecting the devices of the security group 300. Other implementations may include security groups having fewer or additional devices. Further, in one or more embodiments, one or more of the computing devices may be part of another security group and may have one or more additional keys thereon that match keys on other devices within the same security group.

In one or more embodiments, the computing devices 302a-d of the security group 300 may maintain multiple keys for the security group 300 for a variety of reasons. For example, in one or more embodiments, one of the keys from the sets of keys 304a-d may refer to an active key while the second key refers to an inactive key. In this example, for instance, each of the first keys may be indicated as an active key causing network packets generated by any of the computing devices 302a-d to be shared to other devices within the security group 300 to be encrypted using the first key. The second key may be simply maintained and not used for encrypting and/or decrypting data passed between the computing devices 302a-d.

In one or more embodiments, the computing devices 302a-d of the security group may periodically update the sets of keys 304a-d. For example, to enhance security, the computing devices 302a-d may update the sets of keys 304a-d at predetermined intervals to prevent a malicious actor from obtaining a copy of a key and obtaining unauthorized access to information passed between the devices. The network packet communication system(s) 106 may refresh the keys in a variety of ways.

For example, in one or more embodiments, the network packet communication system(s) 106 initiate a re-key process by indicating the inactive key as an active key to replace a previously active key on the computing devices 302a-d. Because each of the computing devices 302a-d already have the pairs of keys 304a-d thereon, this may involve simply providing a notification of the switched status without redistributing a new key. After the previously inactive key has been activated, the old key may be discarded after some period of time has passed and instances of network packets using the old key have drained or otherwise expired, such as where the network packets generated using the old key have been decrypted and would need to be re-encrypted before transmitting to another device. In one or more embodiments, a new key is provided to each of the computing devices 302a-d to be activated at a later time.

While FIG. 3 shows an example in which pairs of keys are implemented on the respective devices, it will be understood that a similar re-key process may be implemented without maintaining multiple associated keys on each of the computing devices 302a-d. For example, in one or more embodiments, the re-key process involves generating and distributing a new secure key to each of the computing devices 302a-d. This new key may act as an inactive key for a time until the key has been registered for each of the computing devices 302a-d of the security group 300. An indication may be communicated to mark the new key as active within the security group at which point the new key may be used by the network packet communication system(s) 106 to generate and authenticate network packets passed between the devices. After some period of time has passed for all the network packets using the old key to expire or otherwise drain from use, the network packet communication system(s) 106 may change the old active key to an inactive status and discard the old key after some duration of time has passed.

Figure 4:
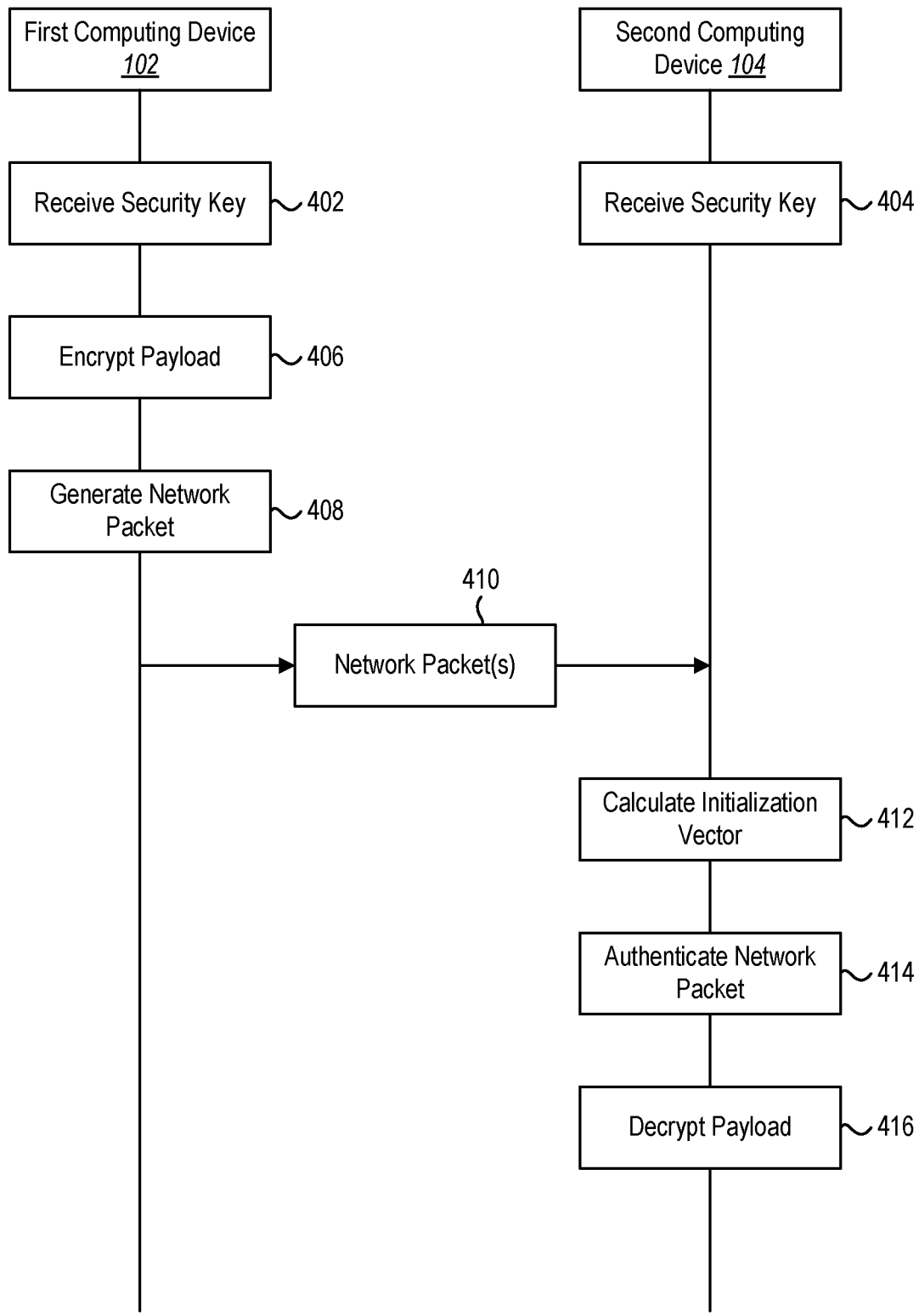
FIG. 4 illustrates an example series of interactions between a sender device and a receiver device in accordance with one or more embodiments.

Additional detail will now be given in connection with an example transmission of a network packet between a sender device and a receiver device. In particular, FIG. 4 illustrates an example implementation of the first computing device 102 discussed above in FIG. 1 generating and communicating a network packet to a second computing device 104 having similar features and functionalities of the additional computing devices 104a-n discussed above in connection with FIG. 1. In one or more embodiments, each of the computing devices 102-104 are part of a common security group in which keys have been distributed between two or more computing devices.

As shown in FIG. 4, a first computing device 102 may perform an act 402 of receiving a security key. As further shown, the second computing device 104 may perform an act 404 of receiving the same security key (i.e., a copy of the same security key). Similar to one or more embodiments described above, the keys may refer to symmetric keys configured to provide encryption and decryption capabilities to each of the computing devices 102-104. For example, data encrypted using a key on the first computing device 102 may be decrypted using the same key (e.g., a copy or replica of the key on the first computing device 102) on the second computing device 104.

As shown in FIG. 4, the computing device 102 may perform an act 406 encrypting a payload. In particular, the network packet communication system 106 on the computing device 102 may identify data to be transmitted to the receiving computing device 104. In one or more embodiments, the network packet communication system 106 encrypts the payload using the key previously received in act 402.

After identifying data and encrypting a payload, the first computing device 102 may perform an act 408 of generating a network packet. As discussed in one or more embodiments herein, the first computing device 102 may generate the network packet to include similar fields and headers as discussed above in connection with FIG. 2. For example, the network packet may include an Ethernet header, IPv4 header, an authentication header, a payload, and an ICV tag.

As mentioned above, the network packet may include a security layer and transport layer integrated within a single authentication header. For example, in one or more embodiments, the authentication header includes fields having data therein that identify a source address, a packet counter value, and a data sequence value. As will be discussed in further detail below, some or all of these values may be used by the second computing device 104 upon receiving the network packet to determine that the packet has been transmitted correctly (e.g., in a correct order relative to other network packets). In addition, these same values may be used to verify security of the network packet, including determining that the network packet is not a repeat packet as well as determining that data included within the network packet has not been modified between the first device sending the network packet and the second computing device 104 receiving the network packet. As will be discussed in further detail below, authenticating the network packet may include verifying that the network packet is not a repeat packet based on a comparison of a computed data sequence number to the data sequence number from the network packet. Additional information will be discussed in connection with acts 412-416 below.

As shown in FIG. 4, upon generating the network packet, the first computing device 102 may perform an act 410 of transmitting or otherwise providing the network packet to the second computing device 104. In one or more embodiments, the network packet is provided via an Ethernet wire between the first and second computing devices 102-104. In one or more embodiments, this communication channel between the respective devices is a backend wired interface capable of high-speed data communication between the respective devices. Further, in one or more implementations, one or more fields of the network packet includes an identification of the specific communication channel between the first and second computing devices 102-104 for use in authenticating the network packet by the second computing device 104.

As shown in FIG. 4, the second computing device may perform an act 412 of calculating an initialization vector. In one or more embodiments, the initialization vector is maintained by the second computing device for the first computing device (e.g., a source device). Indeed, the second computing device 104 may maintain an initialization vector for each of multiple source devices within which the second computing device 104 is in communication via a communication channel. For example, while the second computing device 104 may maintain an initialization vector for the first computing device, the second computing device 104 may similarly maintain a separate initialization vector for each computing device within a common security group as well as one or more computing devices outside of a given security group.

The initialization vector may include information therein that enables the computing device to authenticate the network packet. For example, in one or more embodiments, the initialization vector includes a salt field, which is effectively part of the security key. In one or more embodiments, each computing device that is part of a given security group has access to the salt field. In addition, the initialization vector may include a source address field. This source address field may uniquely identify the first computing device 102 and should match a corresponding field within the network packet. In one or more embodiments, the source address is extracted from the received network packet to populate the source address field of the initialization vector.

In one or more embodiments, the initialization vector may further include a packet counter value field. For example, in one or more implementations, the initialization vector includes forty-eight bits of a packet counter that reflects a number of packets that have been transmitted by the first computing device 102 over some period of time. In one or more embodiments, the packet counter value is calculated based on the packet counter value included within the network packet. The packet counter value field may be appended to the source address field. Thus, in one or more implementations, the initialization vector has ninety-six bits including the salt field, source address field, and packet counter value field.

As shown in FIG. 4, the second computing device 104 may additionally perform an act 414 of authenticating the network packet. As noted above, authenticating the network packet may include evaluating fields of a single authentication header to perform both transport layer and security layer functionality. In particular, the second computing device 104 may determine that the network packet has been transported correctly and that security of the network packet has not been compromised.

With regard to authenticating that the network packet has been transported correctly, in one or more embodiments, the second computing device 104 evaluates a data sequence number from the authentication header to determine that the network packet has been transported in a correct order. As noted above, when generating the network packet, the first computing device 102 may increment the data sequence number for each network packet transmitted to a specific destination device. Thus, the second computing device 104 may evaluate the data sequence number to determine that the network packet has been transmitted in a correct order.

With regard to verifying that the network packet has been securely transmitted, the second computing device 104 may verify security of the network packet based on the packet counter value within the authentication header. For example, as noted above, the second computing device 104 may generate the initialization vector to include the packet sequence number. This calculated value may then be used to determine whether the network packet is a repeat packet. If the network packet is a repeat packet, the second computing device 104 may discard the network packet based on a risk that the received network packet is part of a repeat attack.

In addition to verifying whether the network packet is a repeat packet, the second computing device 104 may determine whether one or more values of the network packet have been modified. In one or more embodiments, the second computing device 104 determines whether any modifications have been made to the network packet by comparing values of a calculated integrity check vector (ICV) to the ICV tag appended to the payload. If the ICVs match, the second computing device 104 may determine that the network packet has not been altered. Alternatively, if the ICVs do not match, the second computing device 104 may drop the packet and provide a notification that the network packet(s) has been compromised.

As shown in FIG. 4, the second computing device 104 may additionally perform an act 416 of decrypting the payload. In one or more embodiments, the second computing device 104 decrypts the payload while an authentication block authenticates that the network packet has been transmitted correctly and securely. Alternatively, in one or more embodiments, the second computing device 104 may decrypt the payload after authenticating the network packet. In one or more embodiments, the second computing device 104 utilizes the security key to decrypt the payload.

Upon authenticating the network packet and decrypting the payload, the second computing device 104 may utilize the decrypted data in a variety of ways. For example, in one or more embodiments, the first and second computing devices 102-104 may be cooperatively performing a computing task, such as training one or more machine learning models. For instance, a security group may include multiple devices having machine learning models thereon that are exchanging weight gradients and other data for training purposes. Indeed, features and functionality of the network packet communication system 106 described herein may be applied to a variety of high performance computing applications where chips on respective devices are being used cooperatively and where high bandwidth communication is beneficial.

Figure 5:
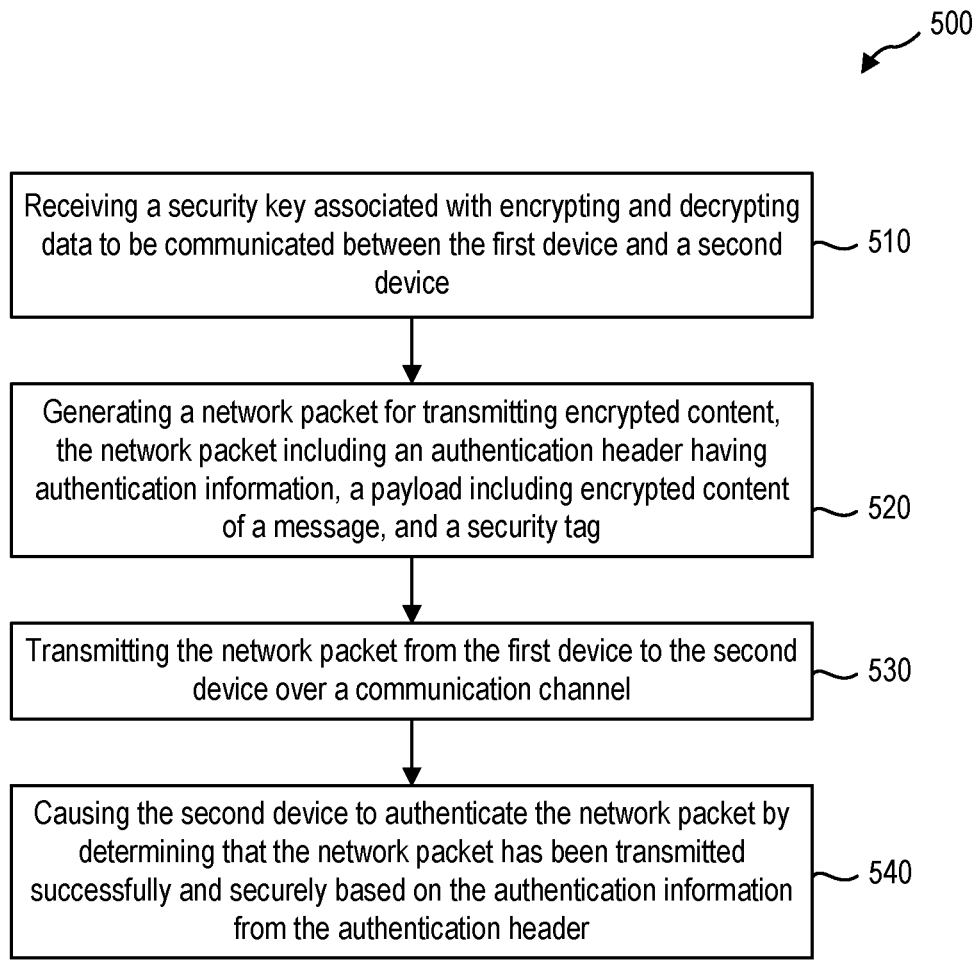
FIG. 5 illustrates an example series of acts for communicating and authenticating a network packet in accordance with one or more embodiments.

Turning now to FIG. 5, this figure illustrates example flowcharts including series of acts for generating and communicating network packets between computing devices in which security and transport layers of the network packets are integrated within a single header. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device) to perform the acts of FIG. 5. In still further embodiments, a system can perform the acts of FIG. 5.

As mentioned above, FIG. 5 illustrates an example series of acts 500 related to generating and communicating network packets between computing devices in which security and transport layers of the network packets are integrated within a single header. As shown in FIG. 5, the series of acts 500 incudes an act 510 of receiving a security key associated with encrypting and decrypting data to be communicated between a first device and a second device. For example, in one or more embodiments, the act 510 involves receiving, at a first device, a first security key associated with encrypting and decrypting data to be communicated between the first device and a second device.

As further shown in FIG. 5, the series of acts 500 may include an act 520 of generating a network packet for transmitting encrypting content where the network packet includes an authentication header having authentication information, a payload including encrypted content of a message, and a security tag. For example, in one or more embodiments, the act 520 involves generating a network packet for transmitting encrypted content from the first device to the second device where the network packet includes a first authentication header including authentication information for the network packet (e.g., a data sequence number and a packet counter value), a payload including encrypted content of a message to be communicated to the second device, and a security tag computing over the first authentication header and the payload.

As further shown in FIG. 5, the series of acts 500 may include an act 530 of transmitting the network packet from the first device to the second device over a communication channel. For example, in one or more embodiments, the act 530 includes transmitting the network packet from the first device to the second device causing the second device to authenticate the network packet. In one or more embodiments, transmitting the network packet enables determining that the network packet has been transmitted successfully and securely via a communication channel. In one or more embodiments, the communication channel is an unsecure Ethernet wire that is part of a backend interface between the first device and the second device.

As further shown in FIG. 5, the series of acts 500 may include an act 540 of causing the second device to authenticate the network packet by determining that the network packet has been transmitted successfully and securely based on the authentication information from the authentication header. For example, in one or more embodiments, the act 540 involves causing the second device to determine that the network packet has been transmitted successfully and securely via a communication channel based on the authentication information from the first authentication header. For example, in one or more embodiments, transmitting the network packet from the first device to the second device causes the second device to authenticate the network packet based on authentication information from the first authentication header. In one or more implementations, authenticating the network packet includes determining that the network packet has been transmitted both successfully and securely via the communication channel based on the first authentication header.

In one or more embodiments, authenticating the network packet includes causing the second device to determine that the network packet has been transmitted in a correct order relative to one or more additional network packets originating from the first device based on identifying a sequence of the data sequence number relative to the one or more additional network packets. In one or more embodiments, authenticating the network packet further includes verifying that the network packet is not a repeat packet based on a comparison of a computed data sequence number to the data sequence number from the network packet.

In one or more embodiments, authenticating the network packet includes calculating an integrity check vector (ICV) based on the first authentication header and the payload. Further, in one or more embodiments, authenticating the network packet includes determining that the network packet has not been modified based on the ICV matching the security tag included within the network packet.

In one or more embodiments, information from the first authentication header is not encrypted when transmitted via the communication channel. In one or more embodiments, a copy of the first security key is issued to the second device. In addition, the initialization vector may be calculated using the copy of the security key based at least in part on the packet counter value from the first authentication header. In one or more embodiments, the initialization vector includes a source address associated with the first device and the packet counter value.

In one or more embodiments, the first and second devices are part of a security group including one or more additional devices. In addition, a copy of the security key may be provided to each of the one or more additional devices to enable the one or more additional devices to authenticate communications from the first device over multiple communication channels. In one or more embodiments, the series of acts 500 includes causing a second security key to be distributed to each of the first device, the second device, and the one or more additional devices, the second security key being designated as inactive. In addition, in one or more embodiments, the series of acts 500 includes activating the second security key based on an activation signal provided to each of the first device, the second device, and the one or more additional devices. The series of acts 500 may further include causing the second security key to be used in encrypting content for one or more subsequent network packets generated by the first device to be communicated to one of the second device or the one or more additional devices. In one or more embodiments, the series of acts 500 includes maintaining an active status of the first security key for a period of time until network packets generated using the first security key have expired.

Figure 6:
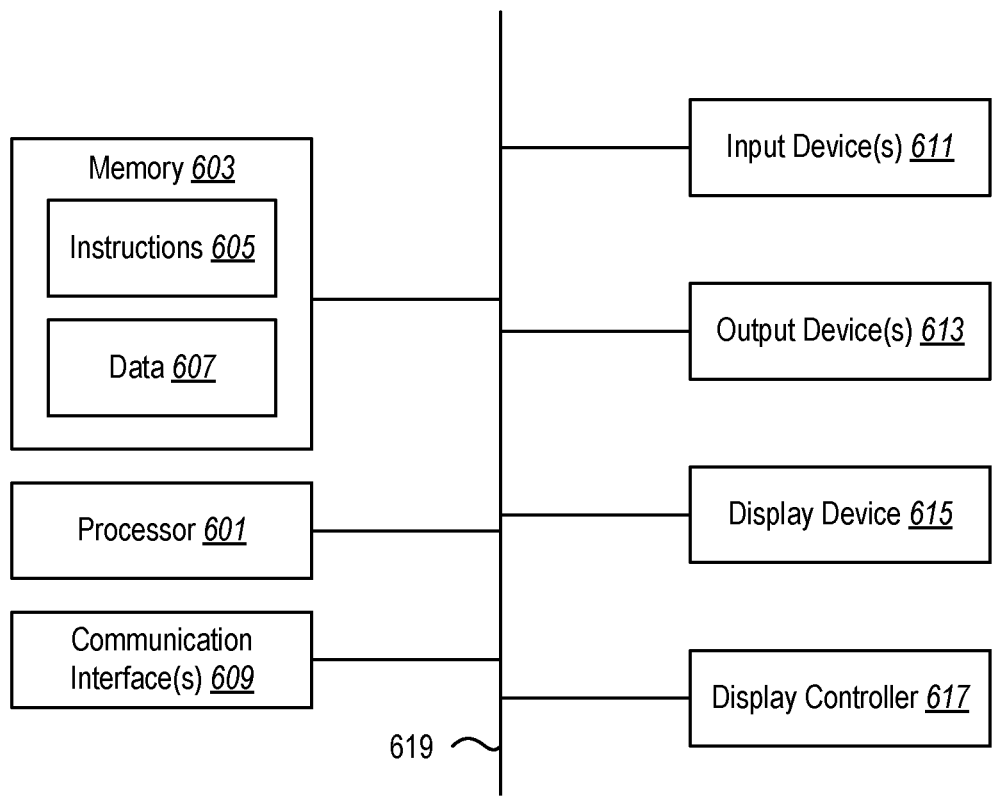
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

receiving, at a first device, a first security key associated with encrypting and decrypting data to be communicated between the first device and a second device;

receiving, at the first device, a second security key associated with encrypting and decrypting data to be communicating between the first device and the second device, the second security key being designated as inactive, the first device and the second device being included within a security grouping of computing devices that each receive the first security key and the second security key, the security grouping of computing devices including the first device, the second device, and one or more additional devices that share a common security key enabling each device from the security grouping of computing devices to encrypt and decrypt data to be communicated between respective devices of the security grouping of computing devices;

receiving an indication that the second security key has been activated;

generating a network packet for transmitting encrypted content from the first device to the second device, wherein the network packet includes:
a first authentication header including authentication information for the network packet, wherein the authentication information includes a data sequence number and a packet counter value;
a payload including encrypted content of a message to be communicated to the second device, the encrypted content being encrypted using the second security key based on the second security key being activated; and
a security tag computed over the first authentication header and the payload; and transmitting the network packet from the first device to the second device, wherein transmitting the network packet enables determining that the network packet has been transmitted successfully and securely via a communication channel.

2. The method of claim 1, wherein transmitting the network packet from the first device to the second device causes the second device to authenticate the network packet based on authentication information from the first authentication header, wherein authenticating the network packet includes determining that the network packet has been transmitted both successfully and securely via the communication channel based on the first authentication header.

3. The method of claim 2, wherein authenticating the network packet includes causing the second device to determine that the network packet has been transmitted in a correct order relative to one or more additional network packets originating from the first device based on identifying a sequence of the data sequence number relative to the one or more additional network packets.

4. The method of claim 3, wherein authenticating the network packet further includes verifying that the network packet is not a repeat packet based on a comparison of a computed data sequence number to the data sequence number from the network packet.

5. The method of claim 3, wherein authenticating the network packet further includes:
calculating an integrity check vector (ICV) based on the first authentication header and the payload; and
determining that the network packet has not been modified based on the ICV matching the security tag included within the network packet.

6. The method of claim 1, wherein a copy of the first security key and the second security key are issued to the second device, and wherein an initialization vector is calculated using the copy of the second security key based at least in part on the packet counter value from the first authentication header and based on the second device receiving the indication that the second security key has been activated.

7. The method of claim 6, wherein the initialization vector includes a source address associated with the first device and the packet counter value.

8. The method of claim 1, wherein copies of both the first security key and the second security key are provided to each of the one or more additional devices from the security grouping of computing devices to enable the one or more additional devices to authenticate communications from the first device over multiple communication channels.

9. The method of claim 1, further comprising:
activating the second security key based on an activation signal provided to each of the first device, the second device, and one or more additional devices within the security grouping of computing devices; and
causing the second security key to be used in encrypting content for one or more subsequent network packets generated by the first device to be communicated to one of the second device or the one or more additional devices.

10. The method of claim 9, further comprising maintaining an active status of the first security key for a period of time until network packets generated using the first security key have expired.

11. The method of claim 1, wherein the communication channel is an unsecure Ethernet wire that is part of a backend interface between the first device and the second device.

12. A system, comprising:
one or more processors;
memory in electronic communication with the one or more processors; and
instructions stored in the memory, the instructions being executable by the one or more processors to:
receive, at a first device, a first security key associated with encrypting and decrypting data to be communicated between the first device and a second device;
receive, at the first device, a second security key associated with encrypting and decrypting data to be communicating between the first device and the second device, the second security key being designated as inactive, the first device and the second device being included within a security grouping of computing devices that each receive the first security key and the second security key, the security grouping of computing devices including the first device, the second device, and one or more additional devices that share a common security key enabling each device from the security grouping of computing devices to encrypt and decrypt data to be communicated between respective devices of the security grouping of computing devices;
receive an indication that the second security key has been activated;
generate a network packet for transmitting encrypted content from the first device to the second device, wherein the network packet includes:
a first authentication header including authentication information for the network packet, wherein the authentication information includes a data sequence number and a packet counter value;

a payload including encrypted content of a message to be communicated to the second device, the encrypted content being encrypted using the second security key based on the second security key being activated; and a security tag computed over the first authentication header and the payload; and transmit the network packet from the first device to the second device, wherein transmitting the network packet enables determining that the network packet has been transmitted successfully and securely via a communication channel.

13. The system of claim 12, wherein transmitting the network packet from the first device to the second device causes the second device to authenticate the network packet based on authentication information from the first authentication header, wherein authenticating the network packet includes determining that the network packet has been transmitted both successfully and securely via the communication channel based on the first authentication header.

14. The system of claim 13, wherein authenticating the network packet includes causing the second device to determine that the network packet has been transmitted in a correct order relative to one or more additional network packets originating from the first device based on identifying a sequence of the data sequence number relative to the one or more additional network packets.

15. The system of claim 14, wherein authenticating the network packet further includes verifying that the network packet is not a repeat packet based on a comparison of a computed data sequence number to the data sequence number from the network packet.

16. The system of claim 14, wherein authenticating the network packet further includes:
calculating an integrity check vector (ICV) based on the first authentication header and the payload; and
determining that the network packet has not been modified based on the ICV matching the security tag included within the network packet.

17. A non-transitory computer readable medium storing instructions thereon that, when executed by one or more processors, causes one or more computing devices to:
receive, at a first device, a first security key associated with encrypting and decrypting data to be communicated between the first device and a second device;
receive, at the first device, a second security key associated with encrypting and decrypting data to be communicating between the first device and the second device, the second security key being designated as inactive, the first device and the second device being included within a security grouping of computing devices that each receive the first security key and the second security key, the security grouping of computing devices including the first device, the second device, and one or more additional devices that share a common security key enabling each device from the security grouping of computing devices to encrypt and decrypt data to be communicated between respective devices of the security grouping of computing devices;
receive an indication that the second security key has been activated;
generate a network packet for transmitting encrypted content from the first device to the second device, wherein the network packet includes:
a first authentication header including authentication information for the network packet, wherein the authentication information includes a data sequence number and a packet counter value;
a payload including encrypted content of a message to be communicated to the second device, the encrypted content being encrypted using the second security key based on the second security key being activated; and
a security tag computed over the first authentication header and the payload; and
transmit the network packet from the first device to the second device, wherein transmitting the network packet enables determining that the network packet has been transmitted successfully and securely via a communication channel.

18. The non-transitory computer readable medium of claim 17, wherein transmitting the network packet from the first device to the second device causes the second device to authenticate the network packet based on authentication information from the first authentication header, wherein authenticating the network packet includes determining that the network packet has been transmitted both successfully and securely via the communication channel based on the first authentication header.

19. The non-transitory computer readable medium of claim 17, wherein authenticating the network packet includes causing the second device to determine that the network packet has been transmitted in a correct order relative to one or more additional network packets originating from the first device based on identifying a sequence of the data sequence number relative to the one or more additional network packets.

20. The non-transitory computer readable medium of claim 19, wherein authenticating the network packet further includes verifying that the network packet is not a repeat packet based on a comparison of a computed data sequence number to the data sequence number from the network packet.

* * * * *